No. 754,892. PATENTED MAR. 15, 1904.
S. ROBBINS.
FISHING TACKLE.
APPLICATION FILED DEC. 2, 1903.
NO MODEL.
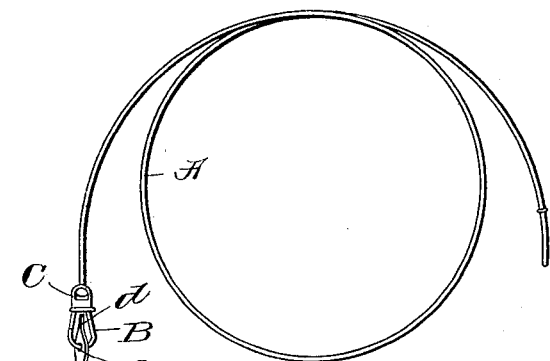
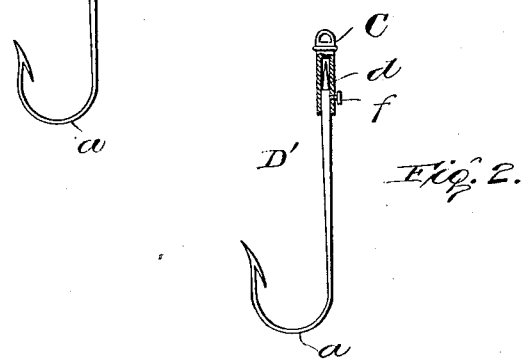
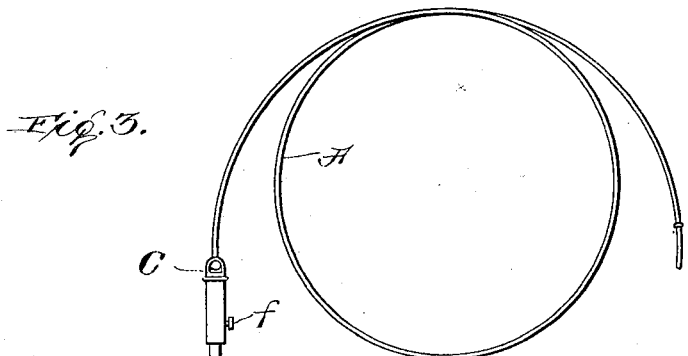

No. 754,892. Patented March 15, 1904.

UNITED STATES PATENT OFFICE.

SILAS ROBBINS, OF OMAHA, NEBRASKA.

FISHING-TACKLE.

SPECIFICATION forming part of Letters Patent No. 754,892, dated March 15, 1904.

Application filed December 2, 1903. Serial No. 183,467. (No model.)

*To all whom it may concern:*

Be it known that I, SILAS ROBBINS, a citizen of the United States, residing at Omaha, in the county of Douglas and State of Nebraska, have invented new and useful Improvements in Fishing-Tackle, of which the following is a specification.

My invention pertains to fish-hooks, and has for one of its objects to provide a fish-hook adapted to be expeditiously disconnected from a line without injury to either hook or line and also adapted to be quickly and easily withdrawn in the direction of its point from a fish caught thereon, this in order to avoid mutilating the fish or subjecting the same to undue torture.

Another object of the invention is to provide a fish-hook adapted to be expeditiously disconnected from a line and having a pointed rear end whereby live bait may be placed on the hook at said end without injury to the bait, as is likely when the same is placed on the hook at the barbed forward end thereof.

With the foregoing in mind the invention will be fully understood from the following description and claims when taken in connection with the accompanying drawings, forming part of this specification, in which—

Figure 1 is a view illustrating a hook constructed and connected to a snell in accordance with my invention. Fig. 2 is a view of a hook and connecting device constituting a modification of my invention, and Fig. 3 is a view illustrative of the manner in which the latter hook is connected detachably to a snell.

Similar letters designate corresponding parts in all of the views of the drawings, referring to which—

A is a line, preferably a snell, the term "line" being intended to comprehend a line proper, a leader, or a snell of any character.

B is a snap-hook permanently connected, through the medium of a swivel C or other means to the line A, and D is a hook made in accordance with my invention. The said hook is peculiar in that its bight *a* is made slender in order to enable the same to readily give and in that the upper portion of its shank *b* is provided with an eye *c*, adapted to receive the snap-hook B after the manner illustrated in Fig. 1. The hook is also peculiar in that it has a pointed and slender upper end *d* for a purpose hereinafter set forth.

In virtue of the hook having the slender bight portion *a* and the eye *c* in the upper portion of its shank it will be observed that when a fish is caught on the hook the hook may be quickly and easily disconnected from the line without injury to either hook or line and may then be withdrawn from the fish in the direction of its barbed point or forward end. When the hook is thus withdrawn from the fish, its shoulder, or rather the shoulder of its barb, is prevented from catching against any portion of the anatomy of the fish, and hence it follows that the withdrawal of the hook may be expeditiously effected and is not attended by mutilation of or undue injury to the fish. Subsequent to the withdrawal of the hook from the fish, as described, the hook may be readily fastened to the line by engaging the snap-hook B with the eye *c* of the hook, as illustrated.

The pointed upper end *d* of the hook is materially advantageous, since when the hook is withdrawn from a fish, as just described, a minnow, smelt, or other live bait may be placed on the hook at said end *d* precedent to connecting the hook to the line through the medium of the snap-hook. The live bait when placed on the hook at the pointed end *d* thereof will obviously not be injured and weakened to the same extent as when placed on the hook over the barbed point at the forward end thereof.

The hook D' (shown in Figs. 2 and 3) has the slender bight *a* and pointed upper end *d* common to the hook D, but differs from said hook D in that it has no eye in the upper portion of its shank. The said hook D' is designed to be detachably connected to a line A by securing, through the medium of a set-screw *f*, the upper end portion of its shank in a socket B', swiveled or otherwise permanently connected to the line, as shown in Fig. 3. While the socket and set-screw *f* may be depended on to prevent disconnection of the hook D' under the pull of a fish on the latter, it permits of the hook being readily disconnected or removed from the line and as readily again connected to the line without injury to either hook or line, for the purpose before described. When the hook D' is separated from the line, a live bait may be impaled on its upper end $d$ in the manner and for the purpose before set forth.

Notwithstanding the practical advantages of my novel hook as pointed out in the foregoing it will be observed that the hook and the means employed to connect it with a line in such manner as to permit of the expeditious removal of the hook without injury to hook or line are simple and inexpensive and are not liable to become impaired after a short period of use.

I have entered into a detailed description of the present and preferred embodiments of my invention in order to impart a full, clear, and exact understanding of the same. I desire it understood, however, that such changes or modifications may be made in practice as fairly fall within the scope of my invention, as claimed.

Having described my invention, what I claim, and desire to secure by Letters Patent, is—

1. In a fishing-tackle, the combination of a line, a hook-connecting device on the line, and a hook detachably secured in said connecting device, and having a pointed upper end arranged in and guarded by said connecting device.

2. In a fishing-tackle, the combination of a line, a hook-connecting device on the line, and a hook detachably secured in said connecting device, and having a pointed upper end arranged in and guarded by said connecting device, and also having a barbed forward end, and a comparatively slender bight portion adjacent to said barbed end for rendering easy its withdrawal from a fish in the direction of the point of the barbed end.

In testimony whereof I have hereunto set my hand in presence of two subscribing witnesses.

SILAS ROBBINS.

Witnesses:
MARY C. PEAK,
ELI GARRETT.